Oct. 8, 1968   O. G. KOPPIUS   3,404,978
COINABLE ELECTRICAL DISCHARGE MACHINE ELECTRODE MATERIAL
Filed Jan. 27, 1967
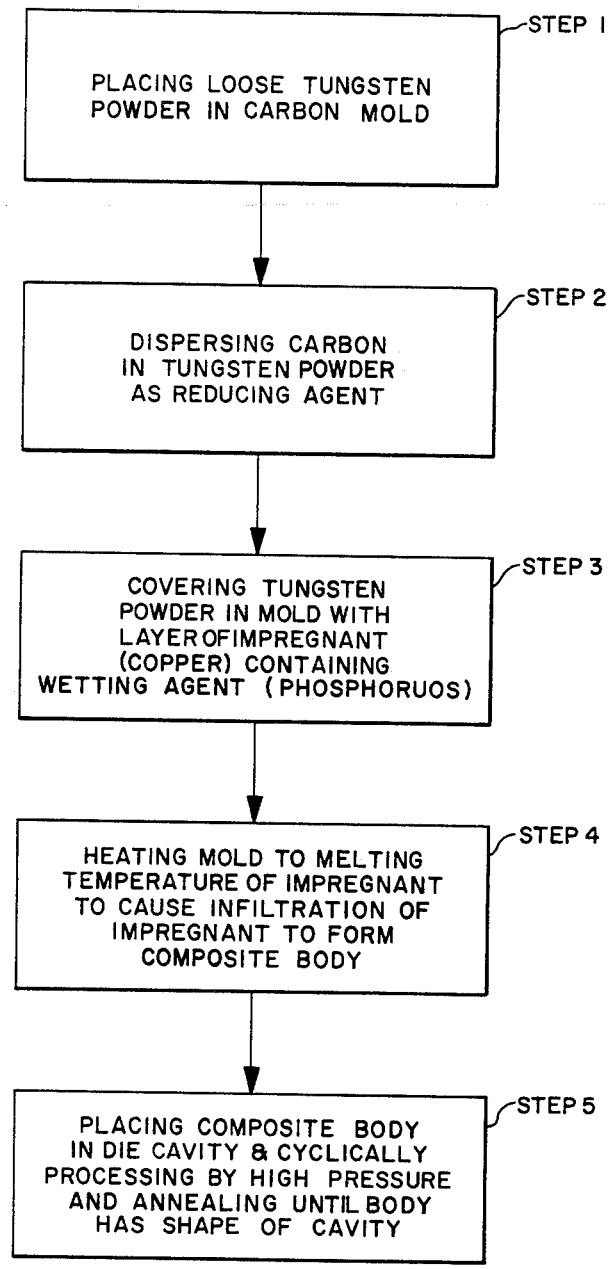
FABRICATION OF EDM ELECTRODE
INVENTOR.
OTTO G. KOPPIUS
BY
ATTORNEY United States Patent Office 3,404,978
Patented Oct. 8, 1968

3,404,978
COINABLE ELECTRICAL DISCHARGE MACHINE
ELECTRODE MATERIAL
Otto G. Koppius, 54 Industrial Road,
Florence, Ky. 41042
Filed Jan. 27, 1967, Ser. No. 612,173
7 Claims. (Cl. 75—208)

ABSTRACT OF THE DISCLOSURE

A method of producing an electrical discharge machine electrode wherein tungsten powder placed in a mold is covered with copper or silver, the mold then being heated to the melting temperature of the copper or silver, causing the molten metal to infiltrate the tungsten powder to form a composite body. This body is then placed in a die cavity where it is subjected to pressure and annealing operations until it has assumed the desired configuration.

This invention relates generally to electrodes adapted for electrical discharge machining techniques, and more particularly to electrode materials that can be coined or formed to a given contour by high energy impact or pressure.

The electrical discharge machining technique is commonly referred to as "E.D.M." It is based on the controlled erosion of a metal arising from a rapidly recurring spark discharge impinging on the surface being machined. The workpiece melts in a small area surrounding the point at which it is struck by the spark, and a portion of the liquefied or vaporized metal is expelled. This is accomplished by submerging the workpiece and the spark electrode or tool in a dielectric fluid which is circulated to flush away the eroded swarf. The electrode and workpiece separation is maintained by a servomechanism.

The E.D.M. technique is especially useful in fabricating difficult-to-machine parts and in the formation of odd-shaped holes, die cavities and other intricate configurations which defy traditional cutting-tool methods. It is also of great value in certain machining applications where tool force or pressure must be held to a minimum.

Of all the parameters involved in the E.D.M. process, the choice of electrode material is generally the most important. A complex die configuration requires that much time and effort be spent in making the electrode tool. In most instances, several identical electrode tools must be made in order to produce a successful E.D.M. job, for such tools are subjected to nose and corner wear. Heretofore E.D.M. operators have sought to make a precision die or cavity mold of the electrode tool and then use the mold as a master to form many electrode tools of the same configuration.

The usual procedure is to cast the electrode with some fusible material such as zinc die cast alloys, babbitt or zinc-tin alloys. These have not proven to be practical because all of these materials exhibit very poor E.D.M. wear rates, and most all undergo a dimensional shrinkage when the fusible material solidifies. Thus, the original master electrode mold must be corrected to allow for these changes. For these reasons, E.D.M. operators have usually not used cast electrodes, even though the general procedure has merit.

A desirable material is one characterized by a good E.D.M. wear rate so that minute details of any die configuration can be accurately duplicated without having to use an excessive number of electrodes. Finally, and most essential, the material must exhibit sufficient room temperature ductility that it will flow without cracking when subjected to high pressure or high energy impact. None of the commercially available E.D.M. electrode materials such as copper and/or silver tungsten E.D.M. electrode materials, fully satisfy these requirements.

Accordingly, it is the main object of this invention to provide E.D.M. electrode material that can be coined or otherwise formed to a given contour by high energy impact or pressure.

Briefly stated, this object is attained by copper and/or silver tungsten E.D.M. electrodes containing 50% or less by weight tungsten which are sufficiently ductile to be high pressure or high energy impact formed to the desired shape. The fact that this material is sufficiently ductile to be formed or coined by high pressure does not mean that it will make a good E.D.M. electrode. A freshly prepared piece of such material which has not been either hot or cold worked shows a very erratic wear rate when tested as an E.D.M. electrode. That is, there are areas on the electrode that are presumably softer or harder than others and as a consequence the erosion is non-uniform. In fact, it is so bad that the material has no practical value if used in this state.

A practical and very useful E.D.M. electrode can be made of such material if it is either hot or cold worked. That is, the material must be worked then annealed, and then worked repeatedly. The best results have been obtained when the cold work was done directly against the die or mold that is to be duplicated. The E.D.M. electrode must be annealed and replaced into the mold for a second time, annealed and so forth. Three of such operations appear to be a minimum number necessary to obtain a uniform material with sufficient die detail to be useful as an E.D.M. electrode.

Although the precise technical relationships of these interactions are not completely understood nevertheless a brief account of what appears to happen might be of value. Tungsten, silver and copper are mutually insoluble in one another, however both copper and silver will wet tungsten. The new E.D.M. material is made by impregnating a loose pile of tungsten powder with either molten copper or silver. The tungsten particles in such a pile will touch each other but there are no rigid or permanent bonds between them. The copper or silver as the case may be acts as a cementing agent between the tungsten particles. Another way of saying the same thing is that the copper has been dispersion hardened by the harder high melting tungsten particles. It is extremely difficult to make such a composite mass completely uniform, as the distribution of tungsten powder is never the same from point to point, and the impregnation by copper is rarely complete. This non-uniformity, it is surmised, is the cause of the erratic E.D.M. erosion as was mentioned previously.

Under high pressure or high energy impact the copper, because it is much softer, behaves more or less like a fluid whereas the movement of the rigid tungsten particles are governed by frictional forces. Thus, under these conditions, the tungsten particles will move closer together, voids will be filled, and the composite will become more uniform. The excess copper will move toward areas within the compacting mass that results in the least movement of the total material. Unfortunately, one application of high pressure or high energy impact to the material results in only a finite movement since it will work harden. Any further application without first annealing the material results in only a minor displacement. Depending upon the die complexity it may take as many as six applications, however three will usually be enough for most purposes.

The hardness of tungsten-copper/silver composites increase consistently with tungsten content. The tensile ength rises slowly in the copper rich compositions, but ove about 50% tungsten by weight it increases rapidly the expense of ductility. Only compositions up to about )% tungsten are sufficiently ductile to permit cold working without fracturing. Most commercially available tungsten-copper/silver E.D.M. electrode material contains ore than 50% tungsten. To obtain these values it is cessary to compact the loose tungsten powder in the rm of a bar or a brick in order to increase the percent e of tungsten to above 50% by weight. In such a compacted bar there are less voids, the tungsten particles are oser together, and after impregnation by copper or silver the uniformity is sufficiently good that such material n be used as E.D.M. electrodes with moderate success. s was indicated previously, this is not the case for material containing 50% or less by weight tungsten.

In the single figure annexed to the specification, there shown a flow chart of the sequence of steps involved 1 making E.D.M. material in accordance with the invention.

Step 1.—Use is made of a carbon mold in the form f a flat plate with a center section thereof recessed. ungsten powders having a mean particle diameter of .5 microns are poured into the mold. The mold is tapped ently until the tungsten power is uniformly distributed 1 the recessed cavity.

Step 2.—It has been found that freshly sintered tungten tends to impregnate more uniformly than older tungten, for the latter develops, through oxygen absorption, thick oxide layer which hinders impregnation. To overome this drawback, fine carbon particles are interspersed vithin the tungsten particles, the carbon acting to reduce he oxide layer when heated in a hydrogen atmosphere. A convenient way of introducing carbon is to use a solution of a coal tar in a chlorinated solvent, and thereafter emove the solvent. A satisfactory composition for this urpose is 5% by weight of plicene in the tetrachloroethylene. This solution is poured over the tungsten powder in the mold until the mold is fully covered.

Step 3.—The carbon mold is then placed in a stream of warm air until the tetrachloroethylene has evaporated. It is to be noted that any black coal tar pitch, even road ar, is a satisfactory source of carbon.

Step 4.—In order to obtain uniform impregnation, a wetting agent is essential to increase the fluidity and wetting characteristics of the impregnant. The carbon added in Step 2 serves to reduce oxides on the surface of the tungsten which interferes with this wetting action. The preferred wetting agent is phosphorous. Thus, in this step, there is added on top of the tungsten powder an excess of copper 1% phosphorous alloy.

Step 5.—The carbon mold containing the tungsten powder and the copper −1% P is then placed in a hydrogen furnace where the temperature is slowly increased to about 950° C., and held at this temperature for about 10 minutes, after which the temperature is increased to 1250° C. for about 5 minutes. At 950° C., which is below the melting point of the copper, the oxide layers on the tungsten particles are reduced by the carbon in the presence of the hydrogen. At 1250° C., the copper is molten at which time it infiltrates the loose tungsten powder. By the use of the reducing and wetting agents uniformity of impregnation is improved.

The impregnated plate made in Step 5 usually has an excess of copper on the surface. It is machined in the form of a flat plate approximately 1/16″ thick by 1″ by 2″. The material is now ready to be formed or cold worked by high pressure or high energy impact to the die configuration.

Step 6.—There are two ways to form the new E.D.M. material to the die configuration. In one method, a sheet of the E.D.M. material approximately 1/16″ thick is laid over a die cavity, the combination is placed on the platen of an ordinary hydraulic press, a hardened billet the size of the die cavity is placed on the E.D.M. material in direct juxtaposition with respect to the cavity. Pressure is applied on the hardened billet to approximately 125,000 lbs. per sq. in. The partially formed E.D.M. electrode is removed and annealed at 550° C. in air for about 10 minutes and then replaced on the die cavity and the pressure is reapplied as was described previously. This operation is repeated three times. The resultant formed electrode duplicated the die cavity with amazing accuracy. Six of such replicas were made and only four were used to E.D.M. a carbide cavity.

In an alternative method, several formed electrodes were made by means of high energy impact. In many respects, this is the most practical means of forming such electrodes, as it is simple, rapid and it does not require expensive equipment. In this method the high energy shock wave from a 12 gauge shot gun shell was used to form the electrode. The die with the E.D.M. material located over the die cavity was submerged with the cavity up in a heavy steel tank which was about half full of water. The E.D.M. material was sealed to the die with waterproof masking tape as it is essential at this time that no water enters the die cavity. The shot gun was mounted on a rigid frame with the muzzle pointed down and about six inches above the water level. The gun was arranged so that it could be fired remotely. The lead pellets were removed from a 12 gauge shell, the gun was loaded with this shell and then fired. This procedure was repeated three times with an annealing operation between each firing. The shock waves from the blasts formed the E.D.M. electrode to the die configuration with amazing accuracy.

Results

Standard E.D.M. electrode material tests are of little value in evaluating coinable material. In practice, one is interested in obtaining die detail, and as a consequence the rate of metal removal is kept low. Further, most die configurations are such that the dielectric oil flow is almost negligible and as a result the cutting rate of necessity would have to be low. Consequently any quantitative test would have to be made at low metal removal rates and under the conditions of poor dielectric flow. In practice, the number of replica electrodes needed to form a given die cavity is the final economic test that determines whether a material is useful. To form a die of an automobile ignition key with the raised engraving "A Family of Fine Cars" it took four electrodes. Eight to ten zinc type castable electrodes are needed to do the same job.

A conventional E.D.M. test was made comprising a commercially available electrode material, Mallory 10W3, with the new electrode material containing about 40% by weight tungsten made by the process described. The following results were obtained:

|  | Mallory 10W3 | New Material |
|---|---|---|
| Length of the E.D.M. electrode before Test (in.) | 2.887 | 2.231 |
| Length of the E.D.M. electrode after Test (in.) | 2.869 | 2.209 |
| Electrode Material Eroded (in.) | .018 | .022 |
| Depth of Penetration (in.) | .081 | .0785 |
| Wear Ratio: Depth of Penetration_Material Eroded | 4.5 | 3.6 |

Die Material—General Electric 883 Tungsten Carbide.

The new material has a wear ratio of approximately 80% of that of Mallory 10W3. In all other respects its performance is equivalent to 10W3. The important difference is that the new material can be formed by high pressure or high energy impact whereas 10W3 can not be. The wear ratio of the new material is about a factor of three better than that of zinc castable alloys under the same conditions of testing.

While there has been disclosed a preferred technique in accordance with the invention, it is to be understood that many changes may be made therein without departing from the essential spirit of the invention as defined in the annexed claims.

What I claim is:

1. The method of producing an E.D.M. electrode comprising the steps of:
   (A) placing loose tungsten powder in a mold,
   (B) covering the tungsten powder in the mold with an impregnant selected from the class consisting of copper and silver,
   (C) heating the mold to the melting temperature of the impregnant to cause the molten metal to infiltrate the tungsten powder to form a composite body,
   (D) placing the body in a die cavity, and
   (E) cyclically processing the body by subjecting the body in the cavity to high pressure, removing the body, annealing the body and returning it to the cavity for another cycle until such time as the body has assumed the configuration of the die cavity.

2. The method set forth in claim 1, wherein said pressure is effected hydraulically.

3. The method set forth in claim 1, wherein said pressure is effected by high energy impact.

4. The method set forth in claim 1 wherein said electrode contains less than 50% by weight tungsten.

5. The method set forth in claim 1, wherein said electrode contains about 40% tungsten.

6. The method set forth in claim 1, further including the step of adding about 1% phosphorous to the impregnant as a wetting agent.

7. The method set forth in claim 1, further including the step of adding carbon to the tungsten particles to reduce oxides, said heating being carried out in a hydrogen furnace.

References Cited

UNITED STATES PATENTS

| | | | |
|---|---|---|---|
| 2,175,899 | 10/1939 | Kelly | 75—20 |
| 3,290,124 | 12/1966 | Holtzclaw | 75—208 |
| 3,303,559 | 2/1967 | Holtzclaw | 75—208 |
| 3,360,348 | 12/1967 | Schreiner | 75—208 |

CARL D. QUARFORTH, *Primary Examiner.*

A. J. STEINER, *Assistant Examiner.*